United States Patent
Crowell et al.

(10) Patent No.: US 8,151,337 B2
(45) Date of Patent: Apr. 3, 2012

(54) APPLYING FIREWALLS TO VIRTUALIZED ENVIRONMENTS

(75) Inventors: Zachary Thomas Crowell, Redmond, WA (US); Yousef A. Khalidi, Bellevue, WA (US); Madhusudhan Talluri, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1234 days.

(21) Appl. No.: 11/479,458

(22) Filed: Jun. 30, 2006

(65) Prior Publication Data
US 2008/0022385 A1   Jan. 24, 2008

(51) Int. Cl.
*H04L 29/06* (2006.01)
(52) U.S. Cl. ......................................................... 726/11
(58) Field of Classification Search .................. None
See application file for complete search history.

(56) References Cited

U.S. PATENT DOCUMENTS

| | | | | |
|---|---|---|---|---|
| 5,829,046 | A | 10/1998 | Tzelnic et al. | 711/162 |
| 6,922,774 | B2* | 7/2005 | Meushaw et al. | 713/151 |
| 2002/0069369 | A1* | 6/2002 | Tremain | 713/201 |
| 2003/0135738 | A1 | 7/2003 | Marquet et al. | 713/182 |
| 2003/0208606 | A1 | 11/2003 | Maquire et al. | 709/227 |
| 2004/0260937 | A1* | 12/2004 | Narayanan | 713/200 |
| 2005/0021755 | A1 | 1/2005 | Hipp et al. | 709/225 |
| 2005/0021788 | A1* | 1/2005 | Tucker et al. | 709/229 |
| 2005/0050336 | A1 | 3/2005 | Liang et al. | 713/188 |
| 2005/0132367 | A1* | 6/2005 | Tewari et al. | 718/1 |
| 2005/0164699 | A1 | 7/2005 | Temple et al. | 455/424 |
| 2006/0013249 | A1 | 1/2006 | Purpura | 370/463 |
| 2006/0095579 | A1* | 5/2006 | Arregoces et al. | 709/229 |
| 2006/0095960 | A1* | 5/2006 | Arregoces et al. | 726/11 |
| 2006/0143699 | A1* | 6/2006 | Nagata et al. | 726/11 |
| 2006/0206300 | A1* | 9/2006 | Garg et al. | 703/27 |
| 2007/0061492 | A1* | 3/2007 | van Riel | 710/3 |
| 2007/0134068 | A1* | 6/2007 | Smith et al. | 406/39 |
| 2007/0280243 | A1* | 12/2007 | Wray et al. | 370/392 |

FOREIGN PATENT DOCUMENTS
WO   WO 2006/010337 A1   2/2006

OTHER PUBLICATIONS

Foo, C.H., "Should Your Organization Implement a Data Diode?", GIAC Security Essentials Certification (GSEC), Practical Assignment Version 1.4b, Option 1, © Sans Institute, Aug. 15, 2004, http://www.giac.org/certified_professionals/practicals/gsec/4054.php, 12 pages.

Hoffman, L.J. et al., "Information Assurance Laboratory Innovations", http://www.whitewolfsecurity.com/IALabInnovations.pdf, 8 pages.

* cited by examiner

*Primary Examiner* — Gilberto Barron, Jr.
*Assistant Examiner* — Shaun Gregory
(74) *Attorney, Agent, or Firm* — Woodcock Washburn LLP

(57) ABSTRACT

Each virtualized environment on a computer has its own set of firewall rules. The virtualized environments share a single instance of the operating system image, a filter engine and a single network stack. A virtualized environment may be a compartment or a server silo. A virtualized environment is a network isolation mechanism and may be used to prevent use of a computer to traverse network boundaries by creating a separate virtualized environment for each network, enabling a separate set of rules to be applied to each virtualized environment and the network interfaces within it. Virtualized environments may also be used to assign different trust levels to the same physical network. Firewall rules are applied by virtualized environment identifier (ID), enabling separate filters to be applied to each virtualized environment on a computer. A virtualized environment may include or be associated with one or more network interfaces.

19 Claims, 5 Drawing Sheets

APPLYING FIREWALLS TO VIRTUALIZED ENVIRONMENTS

BACKGROUND

In construction, a firewall is a fireproof or fire-resistant wall designed to prevent the spread of fire through a building or a vehicle. When the term is applied to a computer system, it refers to a security system consisting of hardware, software or a combination thereof, that limits the exposure of a computer or computer network to attack from unauthorized users. The firewall operates within a networked environment to prevent communications forbidden by a security policy, (typically designed by a system administrator). The firewall attempts to control traffic between different zones of trust. One situation in which a firewall is commonly used is on local area networks that are connected to the Internet to control traffic between the Internet (not trusted) and the internal network (highly trusted). Thus the goal of the firewall is to provide controlled connectivity between zones of differing trust levels by enforcement of a security policy. The proper configuration of firewalls demands skill and a good understanding of network protocols and computer security. Small mistakes can render a firewall worthless as a security tool.

SUMMARY

Each virtualized environment on a computer has its own set of firewall rules. Each virtualized environment is associated with a unique identifier. The set of firewall rules that are applied to each virtualized environment is based on the unique identifier of the virtualized environment. The virtualized environments may share a single instance of the operating system image, a single shared filter engine and a single shared network stack. When a computer is connected to two or more separate networks, use of a separate virtualized environment for each network prevents traversal of network boundaries and enables a separate set of rules to be applied to each virtualized environment and the network interfaces within it. When two or more virtualized environments on one computer are connected to the same network, different virtualized environments may be used to isolate the sessions or users using those virtualized environments so that a session or user is prevented from affecting another session or user's port space, routing tables or firewall rules for that network. A virtualized environment may be a compartment or a server silo. A compartment is a network isolation mechanism and may be associated with a unique compartment identifier (ID). Firewall rules may be applied based on the compartment identifier, enabling separate filters to be applied to each compartment on a computer. A compartment may include or be associated with one or more network interfaces.

A server silo is another kind of network isolation mechanism and may be associated with a unique silo ID. Firewall rules may be applied based on the silo ID, enabling separate filters to be applied to each silo on a computer. A server silo may include one or more compartments. Firewall rules added by a silo administrator are automatically scoped so that they apply only to the silo the administrator manages. System administrators may apply rules based on virtualized identifier (e.g., by compartment ID or by silo ID) or may apply rules to all virtualized environments on the computer.

All the virtualized environments on the computer may share a single operating system image, filter engine and network stack. To determine which rules stored in a rules database in the operating system are applied to a piece of traffic, rules are tagged with a unique virtualized environment identifier. Only those rules which are tagged with the virtualized environment ID to which the interface is associated on which the traffic is sent or received are applied to traffic coming in or going out from that interface. Instead of a particular virtualized environment ID, a range of IDs may be specified for the rules. Because filters are applied by virtualized environment ID when the filter processes a request, not when the filter is added, interfaces belonging to a particular virtualized environment have the filters applied to them automatically, even if the interface is added to the virtualized environment after the filters are set up.

DETAILED DESCRIPTION

Overview

Figure 1:
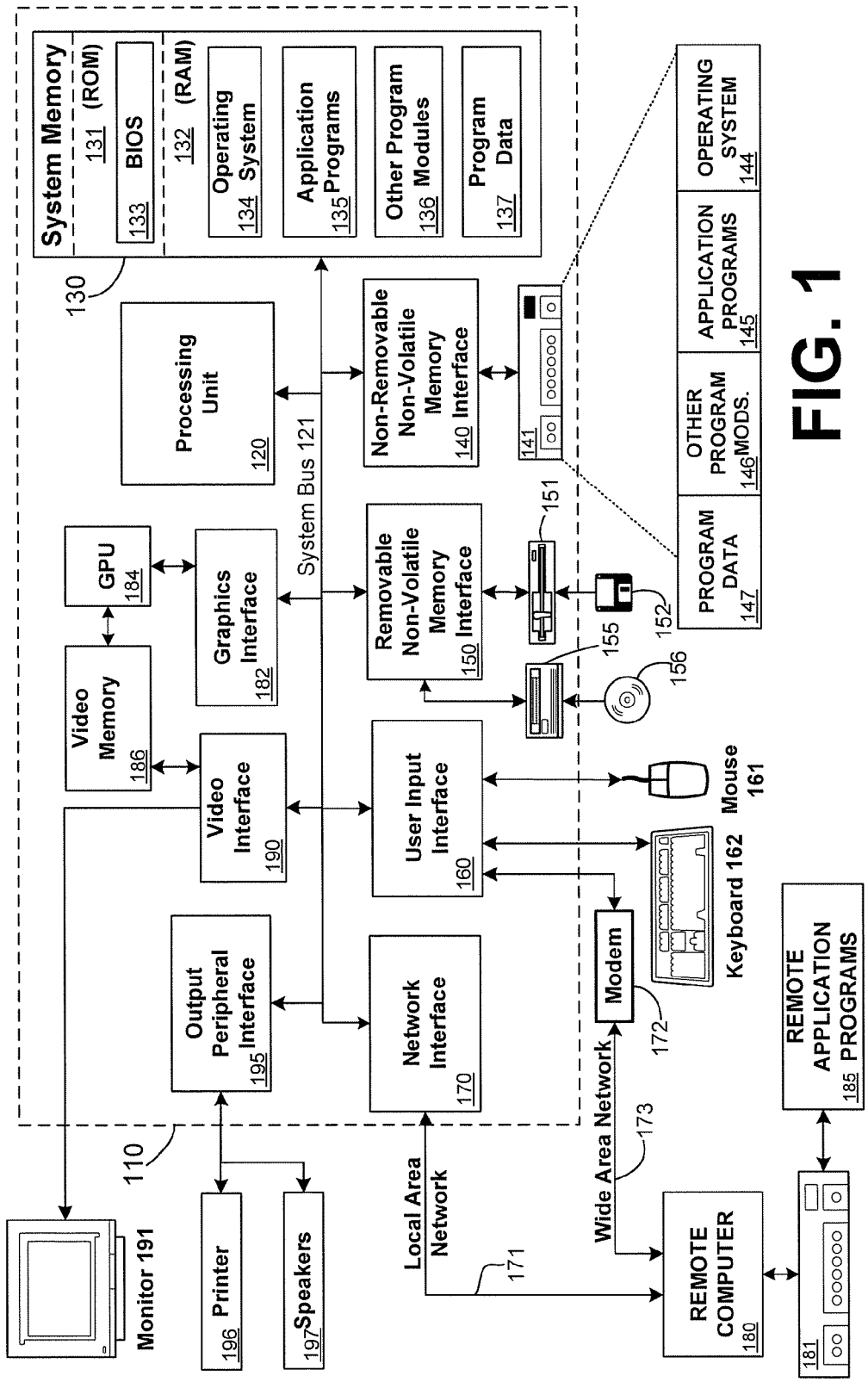
FIG. 1 is a block diagram illustrating an exemplary computing environment in which aspects of the invention may be implemented.

To set up a firewall, someone designs one or more rules. For example, a rule might be: "Block all traffic except traffic coming in on port 80" or "Do not allow this application to talk to any network except the corporate network". These rules are translated into a form in which the rule is represented in the operating system kernel (i.e., into a series of filters). The kernel portion of the operating system maintains a database of the translated rules. When incoming or outgoing traffic is detected, the kernel applies the filters to the packets of information making up the traffic. Packets that make it through the filters are sent on and all others are discarded.

In some operating systems, when a new firewall rule is added, the rule applies by default to the whole machine, although in some cases, attributes can be added to the filter so that the filter only applies to a specific interface on the machine, or to a specific IP (Internet protocol) address. When a computer is connected to two or more different networks, the computer may have different degrees of trust for the different networks to which it is connected. Similarly, when two or more virtualized environments are connected to the same network, the different virtualized environments may have different trust levels for the network. Depending on the degree of trust, the computer may want to restrict access to its services (e.g., file and print sharing) differently for each network or trust level. In addition the computer may utilize different communications protocols (such as TCP/IP, IPsec and other commonly known protocols) on the different networks. Therefore it would be helpful to be able to apply one set of filters to traffic on one network and another set of filters to traffic on a different network or one set of filters to traffic to and from one virtualized environment and another set of filters to traffic to and from another virtualized environment.

Traditionally, if the computer were divided into more than one compartment, the same set of firewall rules would typically apply to all compartments. For example, specifying that a port accepts or blocks incoming connections would affect that port in all the compartments on the computer. Because filters can be restricted to only specific interfaces or addresses, it is possible to apply filters to only those interfaces within a specific compartment. This requires the administrator or other entity adding the filter to query for the interfaces in the compartment and then to either add the filter once for each interface in the compartment or add a single filter which explicitly specifies the set of interfaces in the compartment. An interface moving into the compartment would not automatically have the filters applied to it which correspond to the compartment and is likely to still have the filters associated with its former compartment associated with it instead. This situation requires the administrator to monitor and correct which filters are applied to interfaces as they move into and out of compartments. To address this situation, in accordance with embodiments of the invention, the virtualized environment identifier or ID is added to the set of attributes provided by the filter engine. When a filter is added, the client can specify a virtualized environment ID, or set or range of virtualized environment IDs along with the operation that should be used to filter network traffic. When the filter is applied, it is only applied to the network traffic in the specified virtualized environment. In some embodiments the filter applies to all the interfaces in the virtualized environment at the time the filter operation is performed rather than at the time the filter is added. For example, suppose at the time filter 1 is applied to compartment 1, interface 1 and 2 exist in compartment 1. Suppose later interface 3 is added to compartment 1. Filter 1 will be automatically applied to interface 3. If a filter is not associated with a compartment ID, the filter is applied to all compartments.

For server silos, the compartment mechanism is extended to provide each server silo with its own default compartment. Each compartment is then associated with a particular server silo. Compartments belonging to a server silo follow the same rules described above with respect to compartments not associated with a server silo. Sessions and interfaces may be only associated with compartments within the same server silo; that is, associations may not cross server silo boundaries. A server silo can create a new compartment for its own use but is not allowed to affect the compartments of other server silos. A process running in a server silo in some embodiments of the invention is prohibited from switching its thread's compartment to a compartment outside the server silo.

In some embodiments of the invention, server silos run on a shared single-instance kernel, and only a single kernel-mode filter engine exists. A server silo may however be associated with its own user-mode filter engine. A server silo user-mode filter engine may communicate with the kernel-mode filter engine but may not communicate with other server silo user-mode filter engines. In some embodiments of the invention, server silos share a user-mode filter engine. Therefore to determine when a filter should be applied, the virtualized environment is utilized as the filter boundary. That is, when a filter is added from a server silo, if the filter specifies a compartment ID, the filter engine ensures that the compartment is within the same server silo. If it is not, the filter addition fails. If the filter does not specify a compartment ID, the filter is applied to the server silo, thus affecting all the traffic for the server silo (e.g., all traffic tagged with the silo ID).

A silo is an intra-operating system isolation/containment mechanism that provides for the isolation of a process running on a computer. The silo enables the controlled sharing of some files and restricts access to other files by creating a view of the file system for the process running in the silo. Similarly, the silo controls sharing and restricted access to the entries in the registry by creating a view of the registry for the process running in the silo. The registry view appears to a process running in the silo to be a single registry which is the union of two or more physical registries, the system registry and the registry on the removable medium.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Applying Firewalls to Virtualized Environments

Figure 2:
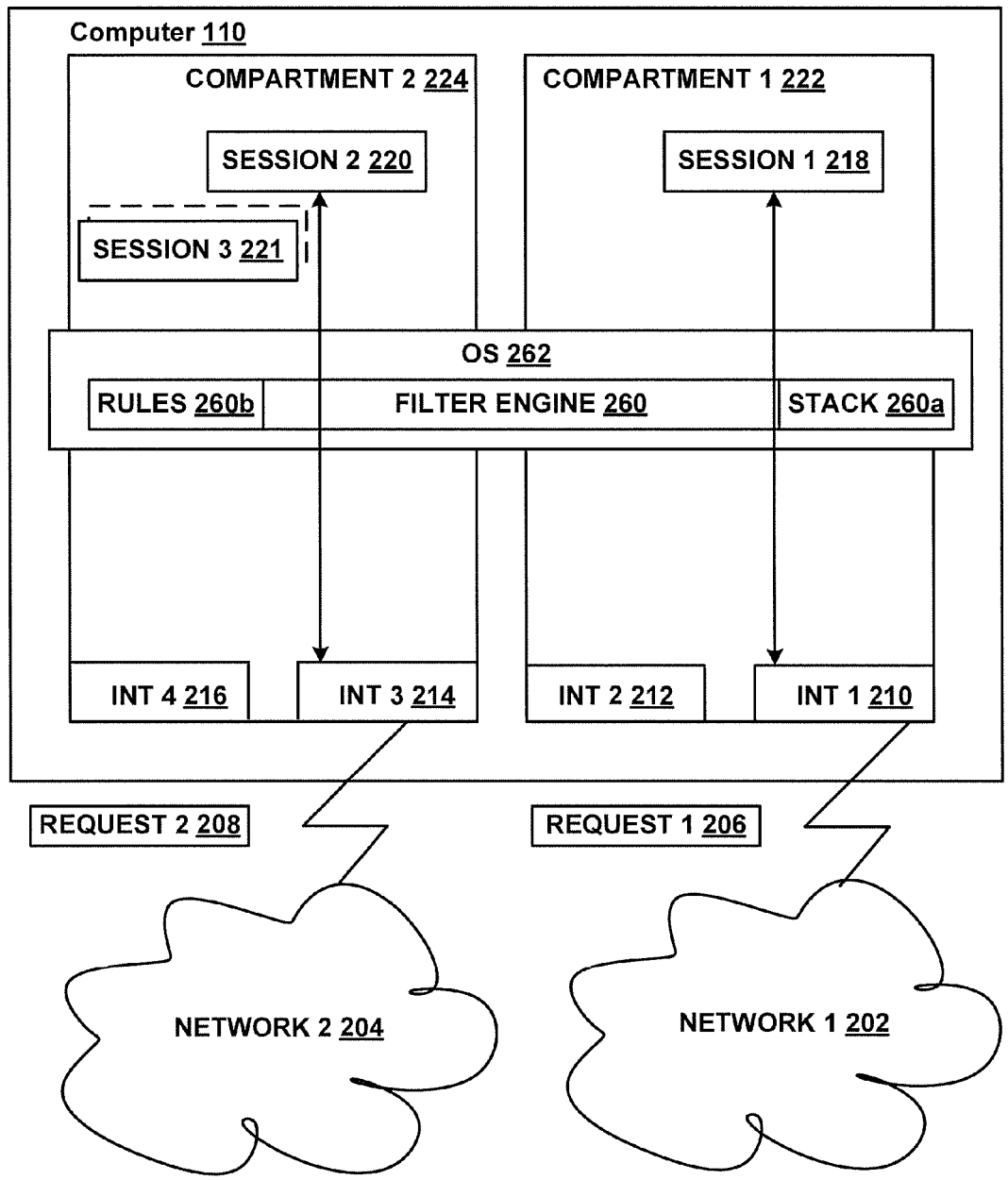
FIGS. 2 and 3 are block diagrams of systems for applying firewall rules to virtualized environments in accordance with some embodiments of the invention.

Different sets of firewall rules can be specified and applied to one or more networks by associating the different networks or different trust levels for the same network with different virtualized environments on a computer having a shared operating system image, filter engine and network stack. FIG. 2 illustrates a system 200 for applying firewall rules to virtualized environments in accordance with embodiments of the invention. System 200 may reside on one or more computers such as computer 110 described above with respect to FIG. 1. System 200 includes a computer 110 connected to one or more different networks, represented in FIG. 1 by network 1 202 and network 2 204. In some embodiments of the invention, the two networks, network 1 202 and network 2 204 represent different zones of trust. For example, network 1 202 may represent a zone of little or no trust such as the Internet and network 2 204 may represent a highly trusted zone such as a business' internal network. Alternatively, two or more virtualized environments may be connected to the same network but assign different trust levels to the network. System 200 may include one or more virtualized environments. A single instance of an operating system 262 is shared by one or more virtualized environments, represented in FIG. 2 by compartment 1 222 and compartment 2 224, etc. Any number of additional compartments may be created. In some embodiments of the invention, a computer will have at least one compartment, denoted as the default compartment in which the system services execute. The service or system session in some embodiments of the invention is associated with the default compartment.

The operating system (e.g., OS 262) may represent a Microsoft WINDOWS, Mac OS (and Darwin), Unix, and Linux or other operating system. The operating system in some embodiments of the invention includes a filter engine 260 that applies the network firewall rules and a network stack 260a that is shared by all the applications and virtualized environments running on the system. Rules may be stored in a filter database 260b stored in the operating system 262. In some embodiments of the invention, the filter engine 260 provides a number of attributes that may be specified when a new filter is added. Examples of these attributes include specification of the local and remote IP addresses, the local and remote ports and the local interface the filter applies to.

A compartment is a network isolation mechanism which is especially useful when a computer is connected to two or more separate networks (e.g., in multi-homed personal computer (PC) scenarios), although it will be appreciated that the invention as contemplated is not so limited. The isolation mechanism may operate in such a way that the computer cannot be used to traverse network boundaries by assigning use of a separate compartment for each network. In some embodiments of the invention, each compartment is identified by a locally unique value (the compartment identifier or compartment ID). Each session that runs on the computer, runs within a compartment. No sessions, one session or more than one session may be associated with a particular compartment. For example, in FIG. 2, compartment 1 222 includes one session, session 1 218 and compartment 2 224 includes multiple sessions, session 2 220, session 3 221, etc. Different sessions of the same application (e.g., Application X) may run in different compartments. That is, session 1 218 running in compartment 1 222 and session 2 220 running in compartment 2 224 may both be sessions or instances of Application X or may be sessions of different applications (e.g., Application X and Application Y). Similarly, session 2 220 and session 3 221 may both be sessions or instances of Application X or may be sessions of different applications.

Computer 110 may also be associated with network interfaces. A network interface (also called a network interface card or NIC, network adaptor or network card) is a piece of hardware, software or combination thereof, that enables a computer to communicate with a network. It is a point of interconnection between a user terminal and a private or public network. In some embodiments of the invention, each network interface is associated with a compartment. More than one network interface can be associated with a particular compartment. Hence, each compartment is associated with zero, one or more than one network interfaces. In some embodiments of the invention, to provide network isolation, each compartment is associated with and maintains its own routing information and loopback interface. The separated routing information prohibits network traffic on the computer from being routed from a network interface in one compartment to a network interface in another compartment. In addition, in some embodiments of the invention, the compartment serves as a boundary for port bind requests. When a user-mode application requests a port bind, even if the request specifies that the bind should be on all available addresses the bind is limited to only the interfaces within the same compartment as the application (determined by the session the application is running in.) Two separate application running in different compartments may bind to the same port number without conflict. For kernel mode bind requests, the request may specify that the bind apply to all compartments. The filters applied may depend on the destination of the traffic (e.g., the interface the traffic is received on which may map to a compartment which may map to a server silo, etc.)

In some embodiments of the invention, a process running with the appropriate administrative privileges may switch one of its threads to another compartment. By doing so, the process may take actions in multiple compartments, including initiating connections, binding ports or indirectly forwarding traffic.

In FIG. 2 compartment 1 222 (an exemplary compartment) is associated with two network interfaces, interface 1 210 and interface 2 212. Compartment 2 224 is associated with two other network interfaces, interface 3 214 and interface 4 216. In general, any particular interface will only exist in one compartment (e.g., one would not expect to see interface 1 in both compartment 1 and compartment 2.) When a request such as request 1 206 is received from a network, such as network 1 202, the request is received at the appropriate interface (e.g., interface 1 210), processed by the filter engine 260 and if the request passes the filters associated with the compartment in which the interface is located or with which the interface is associated (e.g., interface 1 210 is associated with compartment 1 222 so the request must pass the set of filters associated with compartment 1 222), the request is sent to the appropriate session (e.g., to session 1 218.) Similarly, when, in FIG. 2 request 2 208 is received from network 2 204, the request is received at interface 3 214), processed by the filter engine 260 and if the request passes the filters associated with compartment 2 224, the request is sent to the appropriate session (e.g., to session 2 220.)

Figure 3:
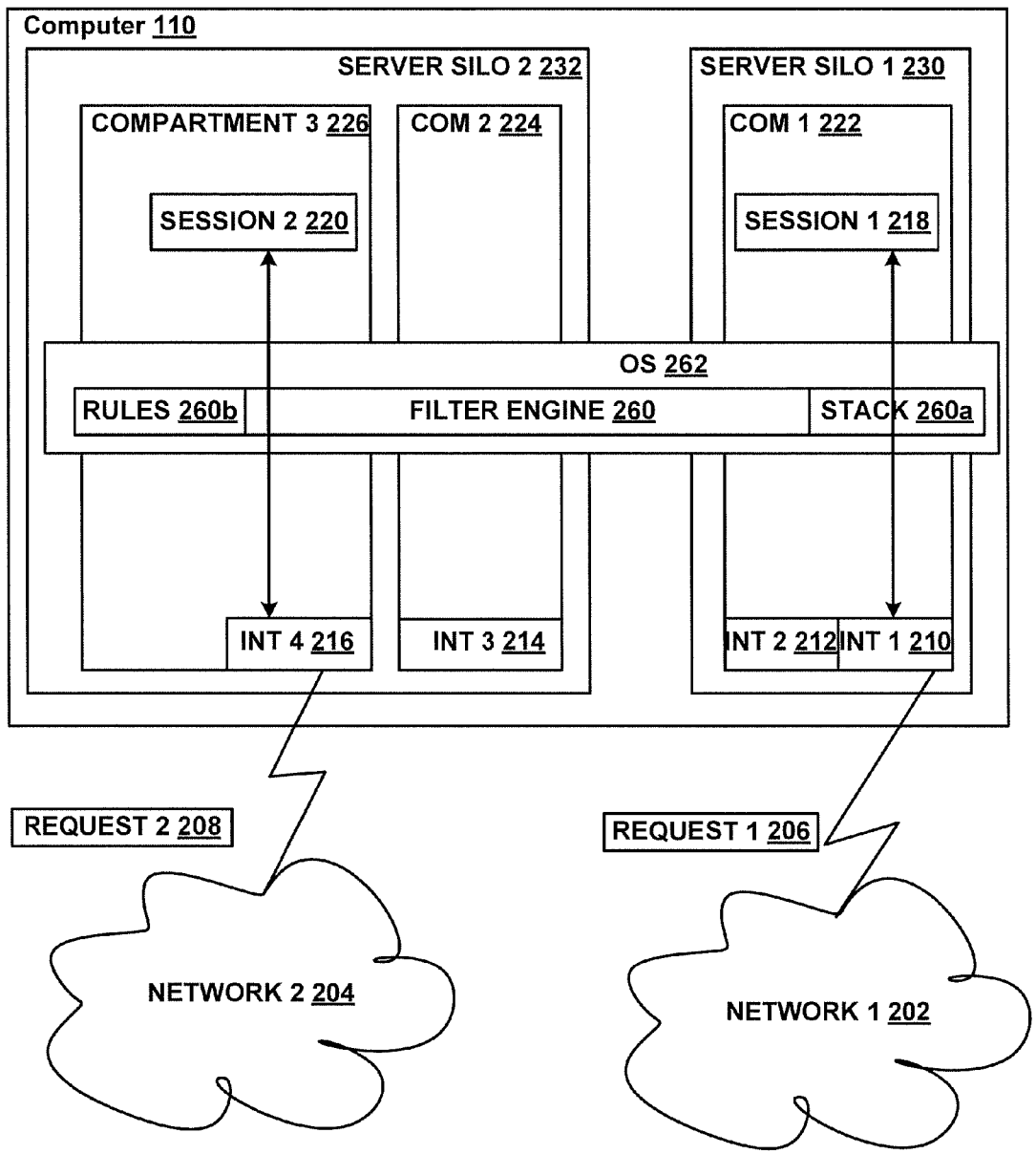

FIG. 3 illustrates embodiments of the invention in which the computer includes one or more server silo virtualized environments. Each server silo includes its own default compartment and may include one or more additional compartments as well. In FIG. 3, server silo 1 230 includes one compartment, compartment 1 222 and server silo 2 232 includes compartment 2 224. Server silos can create additional compartments for their own use. For example, server silo 2 232 can create one or more additional compartments such as compartment 3 226. Network interface 1 210 and interface 2 212 are associated with compartment 1 222, interface 3 214 is associated with compartment 2 224 and interface 4 216 is associated with compartment 3 226. When a request such as request 1 206 is received from a network, such as network 1 202, the request is received at the appropriate interface (e.g., interface 1 210), processed by the filter engine 260 and if the request passes the filters associated with the compartment in which the interface is located or with which the interface is associated (e.g., interface 1 210 is associated with compartment 1 222 so the request must pass the set of filters associated with compartment 1 222), the request is sent to the appropriate session (e.g., to session 1 218.) Similarly, when, in FIG. 3 request 2 208 is received from network 2 204, the request is received at interface 4 216), processed by the filter engine 260 and if the request passes the filters associated with compartment 2 224, the request is sent to the appropriate session (e.g., to session 2 220.)

In some embodiments of the invention, server silos run on a single instance of the kernel of the operating system which is shared by everything running on the computer. Filters added from a silo such as from silo 1 230 are not permitted to affect traffic to or from other server silos such as silo 2 232. Thus when server silo 2 232 adds a filter, the filter engine 260 checks to make sure that if server silo has specified that the filter is to apply to compartment 2 224, that compartment 2 224 is in server silo 2 232. If it were not, the filter would not be added (the filter addition process would fail.) Similarly, if server silo 2 232 does not specify a compartment ID to which the filter is to be applied, the filter is applied to the server silo by tagging the filter with the server silo ID (e.g., the filter would be applied to compartments 2 226 and 3 226 and to any other compartments subsequently added to the silo).

Figure 4:
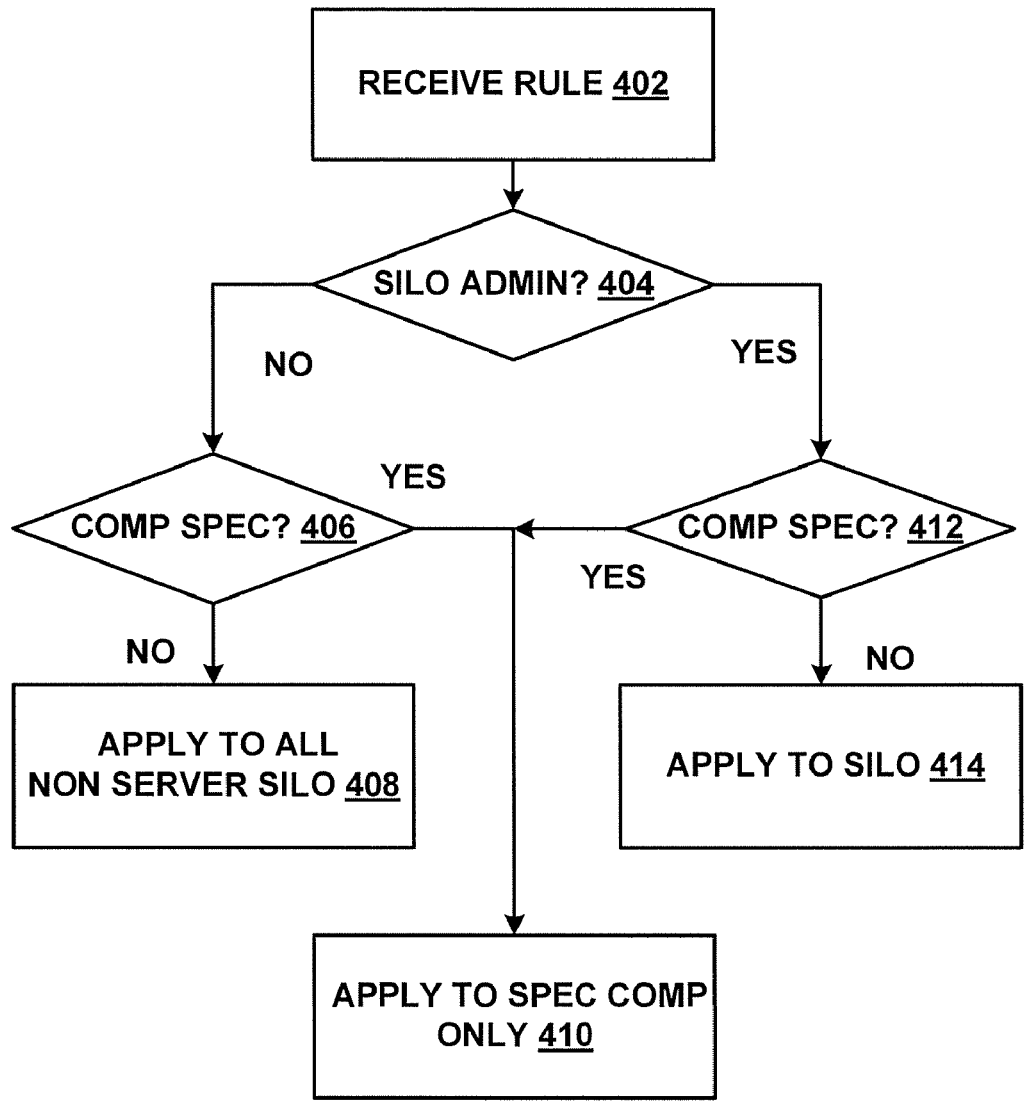
FIG. 4 is a flow diagram of a method for setting up firewall rules for virtualized environments in accordance with some embodiments of the invention.

FIG. 4 is a flow diagram of a method for setting up filters to apply to virtualized environments. When setting up filters to apply to virtualized environments (402), it appears to the administrator that he is setting up firewall rules that will apply to the entire computer. However, the operating system determines if the administrator is a silo administrator or if he has system administrator credentials (404). If the administrator is a system administrator, the administrator is allowed to specify the virtualized environments (406) to which the rule applies or the administrator can have the rule apply to all virtualized environments on the computer (408). If the system administrator fails to identify the virtualized environment to which the rule should apply, in some embodiments of the invention, the default behavior scopes the rule to the infrastructure silo (the outermost or "system silo") and all compartments and or interfaces not belonging to a server silo. If the administrator is a silo administrator (404), the administrator is allowed to specify the compartment(s) (412) to which the rule applies or, if no compartments are specified, the filters are tagged (414) with the server silo ID of the server silo associated with the silo administrator. Rules tagged with a virtualized environment ID are applied only to incoming and outgoing traffic in that virtualized environment (410).

Figure 5:
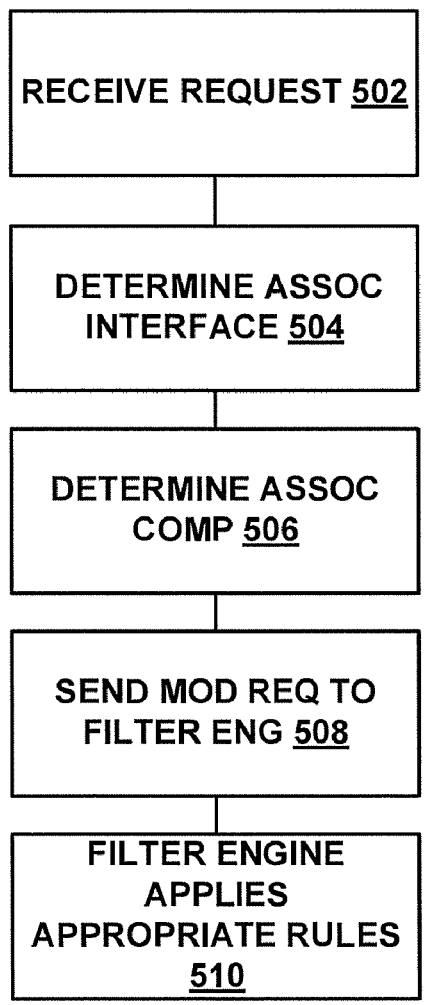
FIGS. 5-6 are flow diagrams of methods for processing firewall rules in virtualized environments in accordance with some embodiments of the invention.

FIG. 5 is a flow diagram of applying filters to incoming traffic in virtualized environments in accordance with some embodiments of the invention. At 502, a request is received on a particular interface in a compartment which may or may not be in a server silo. At 504, the request is examined to determine which interface the request came in on. At 506 the compartment and server silo (if there is one) associated with that interface is determined. At 508 the request is modified to include the compartment and (optionally) server silo information if present, and the request is sent on to the operating system. At 510, the appropriate rules for the compartment and server silo are applied by the filter engine to the request. Alternatively, the request including which interface the request came in on may be sent to the operating system, and the operating system may determine the compartment (and if present, server silo to which the interface belongs). If the incoming traffic passes the security controls specified by the filters, the information packet or request is sent on to the application to which the packet was addressed.

Figure 6:
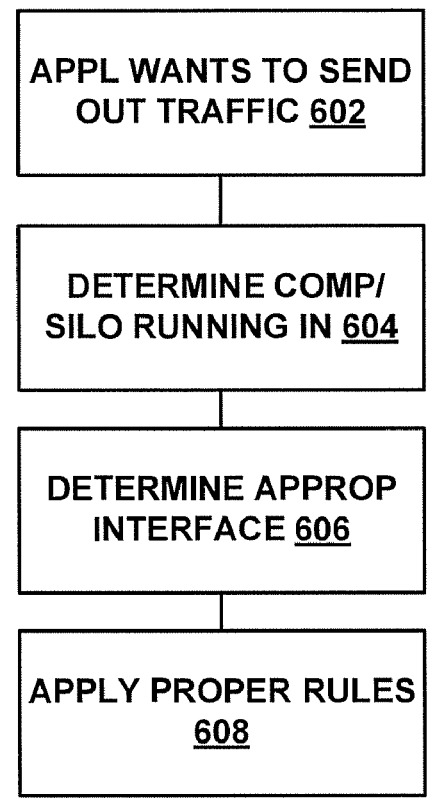

FIG. 6 is a flow diagram of applying filters to outgoing traffic in virtualized environments in accordance with some embodiments of the invention. At 602 an application running in a compartment notifies the operating system that it wants to send outgoing traffic. The operating system determines at 604 which compartment (and if present, which server silo) the application is running in. At 606 when the request is on the network stack, the operating system determines which interface the request will be sent out over and applies the corresponding filters to the request (608). If the outgoing traffic passes the security controls specified by the filters, the information packet or request is sent on to be sent over the wire to the application to which the packet was addressed. The filter engine may apply rules more than once in the stack. For example, rules may be applied after the operating system determines at 604 which compartment (and if present, which server silo) the application is running in.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for applying separate firewall rules to one or more networks connected to a computer, comprising:
   a computing device comprising a processor; and
   a memory coupled to said processor, said memory having stored thereon computer executable instructions that upon execution by the processor cause:
      instantiating on the computer an operating system shared by a first virtualized environment and a second virtualized environment that execute on the computer;
      instantiating on the computer a network stack comprising a filter engine, the filter engine storing a set of firewall rules, the filter engine being shared by the first and second virtualized environments;
      receiving, by a network interface card (NIC) associated with the network stack, a first data from one of the one or more networks;
      based on determining that the first data is directed to the first virtualized environment, modifying, by the NIC, the first data to identify the first virtualized environment;
      sending the modified first data from the NIC to the operating system;
      determining, by the operating system, based on the modified first data having been modified to identify the first virtualized environment, a first subset of the firewall rules;
      applying, by the filter engine, the first subset of the firewall rules to the first data to produce a filtered first data;
      sending the filtered first data to the first virtualized environment;
      receiving, by the NIC, a second data from one of the one or more networks;
      based on determining that the second data is directed to the second virtualized environment, modifying, by the NIC, the first data to identify the second virtualized environment;
      sending the modified second data from the NIC to the operating system;
      determining, by the operating system, based on the modified second data having been modified to identify the second virtualized environment, a second subset of the firewall rules;
      applying, by the filter engine, the second subset of the firewall rules to the second data to produce a filtered second data; and
      sending the filtered second data to the second virtualized environment.

2. The system of claim 1, wherein the first virtualized environment comprises a first compartment associated with a first network of the one or more networks, the second virtualized environment comprises a second compartment associated with a second network of the one or more networks, the first virtualized environment is configured to communicate with the first network but not the second network, and the second virtualized environment is configured to communicate with the second network but not the first network.

3. The system of claim 1, wherein the first virtualized environment is a server silo, wherein the server silo restricts resources available to a process running in the server silo.

4. The system of claim 3, wherein the server silo comprises a first compartment associated with a first network of the one or more networks, and a second compartment associated with a second network of the one or more networks, the first virtualized environment is configured to communicate with the first network but not the second network, and the second virtualized environment is configured to communicate with the second network but not the first network.

5. The system of claim 1, wherein the first virtualized environment is connected to a first network associated with a first trust level and the second virtualized environment is connected to a second network associated with a second trust level different than the first trust level.

6. The system of claim 5, wherein the first network and the second network are different physical networks.

7. The system of claim 5, wherein a first set of filters are applied to incoming and outgoing traffic on the first network and a second set of filters are applied to incoming and outgoing traffic on the second network, wherein the first set of filters is associated with the first virtualized environment and the second set of filters is associated with the second virtualized environment.

8. A method for assigning a filter to incoming and outgoing traffic on a network comprising:
   receiving a first rule to be applied to incoming or outgoing traffic over a network;
   determining that an administrator entering the first rule is an administrator of a first virtualized environment but not a second virtualized environment and has not specified a virtualized environment within the first virtualized environment for the first rule, and in response thereto scoping the rule to the first virtualized environment but not the second virtualized environment;
   receiving a second rule to be applied to incoming or outgoing traffic over the network;
   determining that an administrator entering the second rule is an administrator of the first virtualized environment but not the second virtualized environment and has specified a third virtualized environment but not a fourth virtualized environment, the third and fourth virtualized environments executing within the first virtualized environment, and in response thereto scoping the second rule to the third virtualized environment but not the fourth virtualized environment;
   receiving a third rule to be applied to incoming or outgoing traffic over the network;
   determining that an administer entering the third rule is a system administrator, and has not specified a virtualized environment for the third rule, and in response thereto scoping the third rule to an outermost virtualized environment in which the first and third virtualized environments, the outermost virtualized environment not executing within another virtualized environment;
   receiving a fourth rule to be applied to incoming or outgoing traffic over the network;
   determining that an administer entering the fourth rule is a system administrator, and has specified the first virtualized environment but not the second virtualized environment for the fourth rule, and in response thereto scoping the fourth rule to the first virtualized environment but not the second virtualized environment; and applying the first, second, third and fourth rules to the incoming traffic by matching a unique identifier of the first, second, third, or fourth virtualized environments with an attribute present on the first, second third, or fourth rules when the rule has an attribute matching the unique identifier.

9. The method of claim 8, wherein the rule is scoped to the first virtualized environment by tagging a filter implementing the rule with a unique identifier associated with the first virtualized environment.

10. The method of claim 9, further comprising:
applying the rule only to traffic sent to or received from a session executing in the first virtualized environment, and not to traffic sent to or received from a session executing in the second virtualized environment.

11. The method of claim 9, wherein the first virtualized environment comprises a first compartment associated with a first network of the one or more networks, the second virtualized environment comprises a second compartment associated with a second network of the one or more networks, the first virtualized environment is configured to communicate with the first network but not the second network, and the second virtualized environment is configured to communicate with the second network but not the first network.

12. The method of claim 8, wherein the network is a first network associated with a first trust level and a first set of rules is applied to the first network by tagging the first set of rules with a first virtualized environment identifier and a second set of rules is applied to a second network associated with a second trust level by tagging the second set of rules with a second virtualized environment identifier.

13. The method of claim 12, wherein the first network and the second network are an identical physical network.

14. A computer-readable storage medium having program code stored thereon that, when executed by a computing environment, causes the computing environment to:
receive incoming traffic on a first network interface card (NIC);
determine, based on the incoming traffic being received on the first NIC, that the incoming traffic is associated with a first user session running in a first virtualized environment on a computer, the computer comprising an operating system in which the first virtualized environment and a second virtualized environment execute, wherein a second user session is running in the second virtualized environment, the second user session being isolated from the first user session, the plurality of virtualized environments on the computer sharing a single operating system image, a single filter engine and a single network stack;
based on determining that the network traffic is associated with the first user session running in the first virtualized environment, modify, by the first NIC, the incoming traffic to identify the first user session and the first virtualized environment;
send the modified incoming traffic from the first NIC to the operating system;
determine, by the operating system, a first set of rules of a plurality of sets of rules with which to process the modified incoming traffic based on the modified incoming traffic being directed to the first user session;
apply, by the OS, the first set of firewall rules to the modified incoming traffic by matching a unique identifier of the virtualized environment with an attribute present on the first set of firewall rules, wherein only those rules having an attribute matching the unique identifier are applied.

15. The computer-readable medium of claim 14, having further program code stored thereon, that when executed by the computing environment, causes the computing environment to:
determine that a virtualized environment associated with a session originating outgoing traffic is the first virtualized environment and in response thereto, apply the first set of rules to the outgoing traffic.

16. The computer-readable medium of claim 15, having further program code stored thereon, that when executed by the computing environment, causes the computing environment to:
determine an interface associated with the first virtualized environment, the interface connected to a first network.

17. The computer-readable medium of claim 14, having further program code stored thereon, that when executed by the computing environment, causes the computing environment to:
associate a unique identifier with the first virtualization environment and tag the first set of rules with the unique identifier.

18. The computer-readable medium of claim 17, having further program code stored thereon, that when executed by the computing environment, causes the computing environment to:
apply only the first set of rules to the incoming traffic based on matching the unique identifier with an identifier associated with the incoming traffic.

19. The method of claim 8, wherein the rules are applied by a filter engine executing as a user-mode process, and further comprising:
receiving a fifth rule to be applied to incoming or outgoing traffic over the network;
in response to determining that the fifth rule originated within the first virtualized environment and that the fifth rule indicates a virtualized environment that is neither the first virtualized environment or executes within the first virtualized environment, determining not to implement the fifth rule;
receiving a sixth rule to be applied to incoming or outgoing traffic over the network;
in response to determining that the sixth rule originated within the first virtualized environment and that the sixth rule indicates either the first virtualized environment or a virtualized environment that executes within the first virtualized environment, determining to implement the sixth rule;
applying the sixth rule but not the fifth rule to the incoming traffic by matching a unique identifier of the first, third, or fourth virtualized environments with an attribute present on the sixth rule but not the fifth rule when the rule has an attribute matching the unique identifier.

* * * * *